United States Patent [19]
van Elten et al.

[11] Patent Number: 4,787,803
[45] Date of Patent: Nov. 29, 1988

[54] STORAGE SYSTEM FOR PRODUCTS USING SUPPORTING UNITS

[75] Inventors: Gerrit J. van Elten, Vorrthuizen; Antonius Hurkmans, Baarn; Hugo V. de Vries, Ermelo, all of Netherlands

[73] Assignee: Technisch Ontwikkelingsbureau Van Elten B.V., Barneveld, Netherlands

[21] Appl. No.: 769,991

[22] Filed: Aug. 23, 1985

Related U.S. Application Data

[63] Continuation of Ser. No. 317,953, Oct. 30, 1981, abandoned.

[30] Foreign Application Priority Data

Mar. 6, 1980 [NL] Netherlands ............... 8001352
Aug. 11, 1980 [NL] Netherlands ............... 8004549

[51] Int. Cl.⁴ .................... B65G 1/06; B65G 25/02
[52] U.S. Cl. .................... 414/281; 198/774; 414/267; 414/398
[58] Field of Search ............ 198/468.6, 774; 414/267, 276, 280, 285, 281, 353, 392, 398; 62/378, 380; 98/36

[56] References Cited

U.S. PATENT DOCUMENTS

| | | | |
|---|---|---|---|
| 3,090,211 | 5/1963 | Barroero | 98/36 X |
| 3,123,988 | 3/1964 | Richman | 98/36 X |
| 3,416,646 | 12/1968 | Boos et al. | 198/774 |
| 3,719,288 | 3/1973 | Schmitt et al. | 414/280 |
| 4,248,563 | 2/1981 | Fur | 414/280 |

FOREIGN PATENT DOCUMENTS

670746 1/1966 Belgium ............... 198/774

Primary Examiner—Robert J. Spar
Assistant Examiner—Janice Krizek
Attorney, Agent, or Firm—Ladas & Parry

[57] ABSTRACT

A storage system for products using supporting units, consisting of a staging containing a number of storeys, on one side of the staging at least one supply-conveyor and at least one entry elevating device, which is movable in a longitudinal direction along the staging, as well as a device for placing the supporting units into the staging and on the other side of the staging at least one exit elevating device, which also is movable in a longitudinal direction along the staging and at least one exit conveyor. According to the invention, in each storey (4) of the staging (2) one or more conveyors (5) are mounted which are connectable to both sides of the staging with one driving device (11), which is movable vertically on the entry elevating device (9) and the exit elevating device respectively.

2 Claims, 8 Drawing Sheets

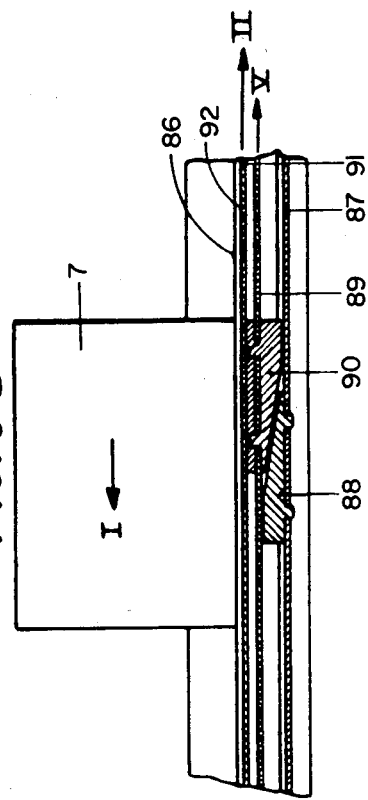
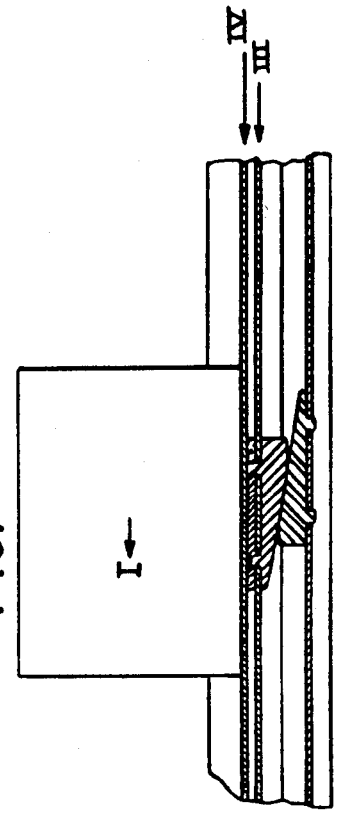
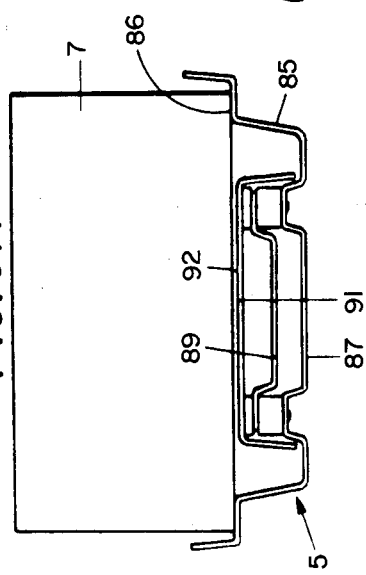
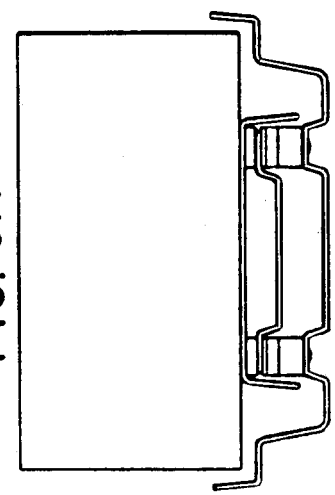

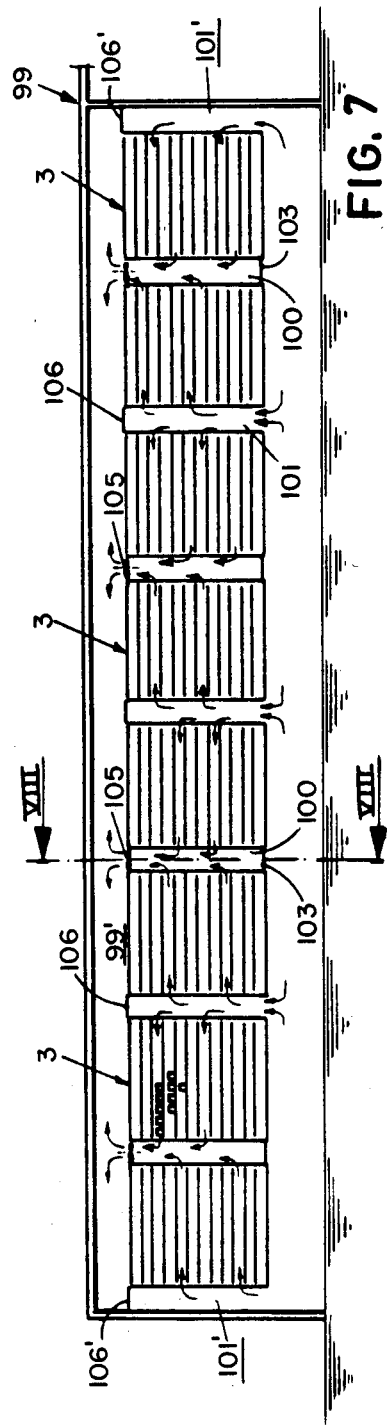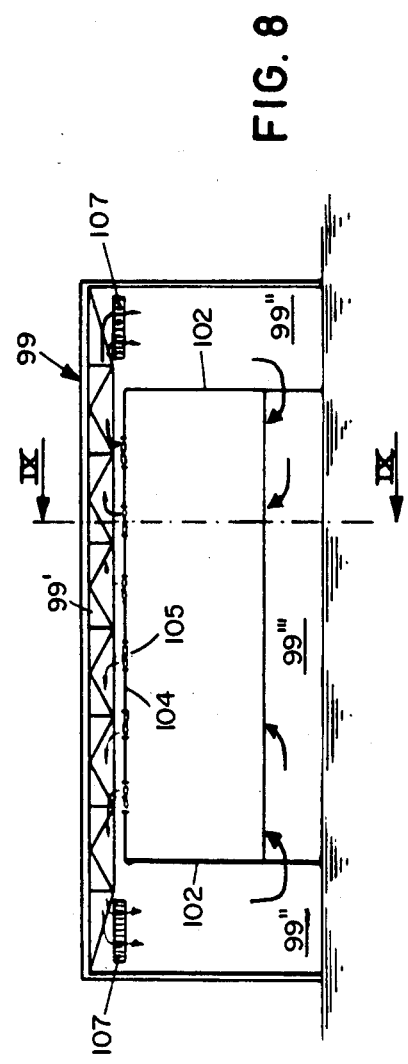

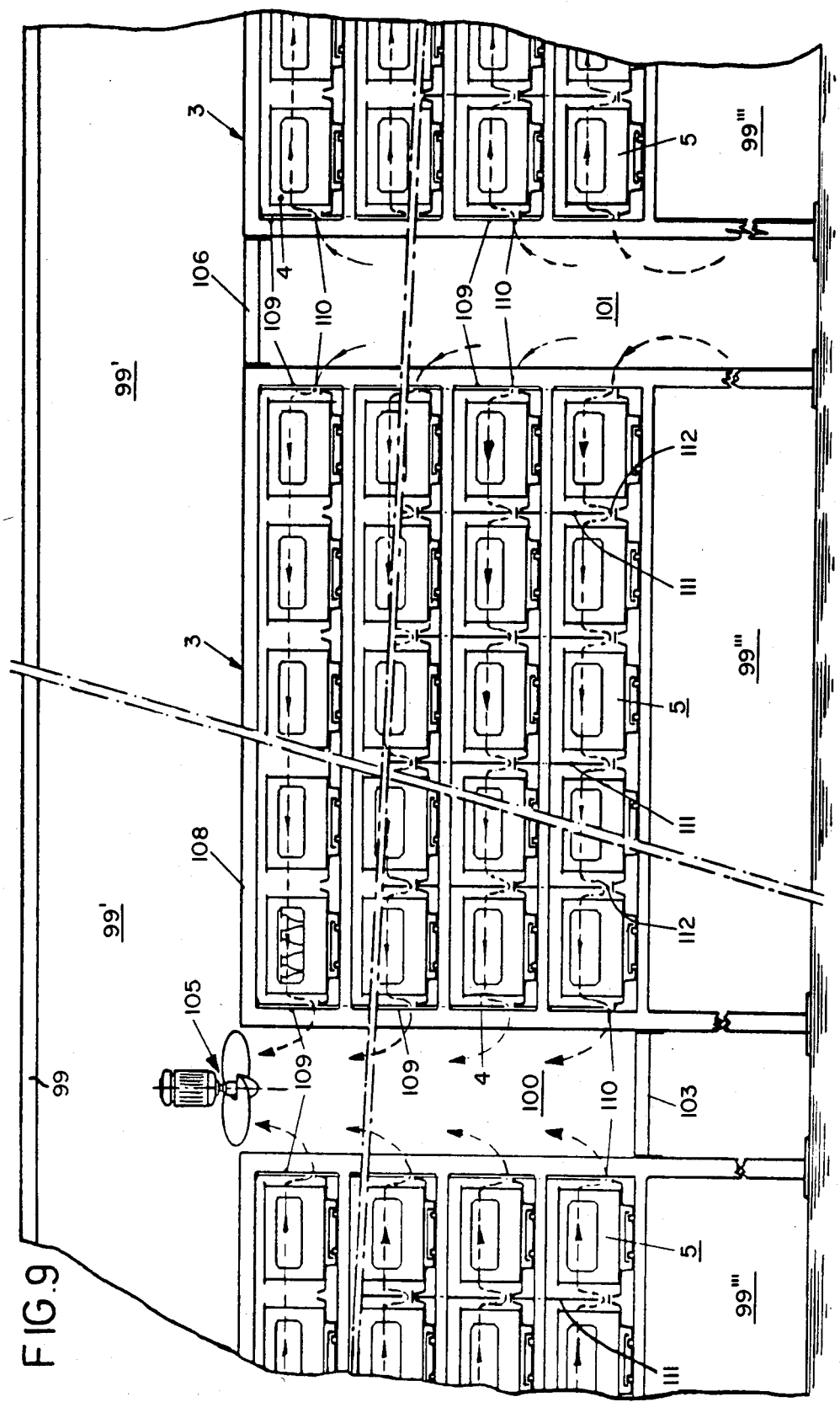

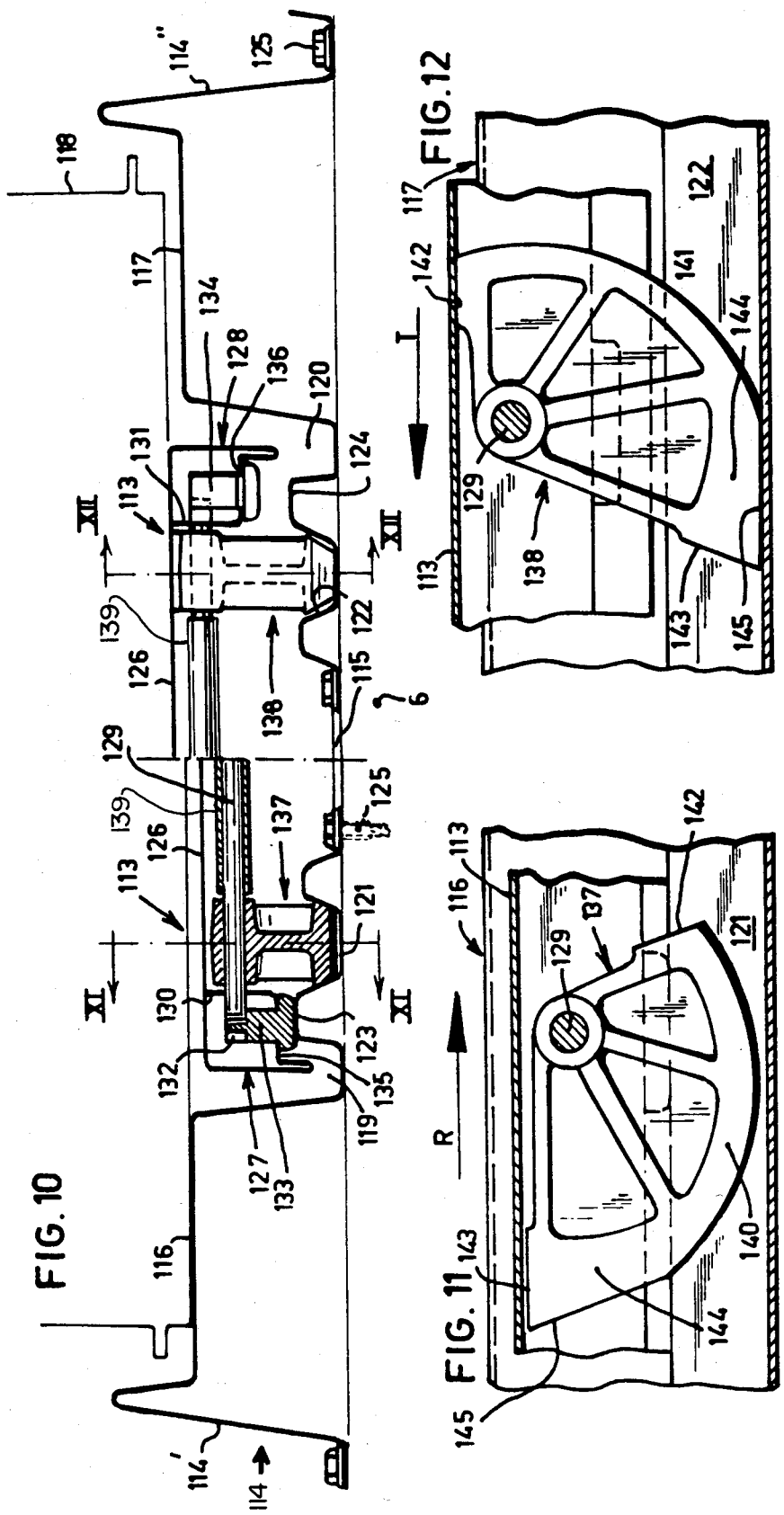

STORAGE SYSTEM FOR PRODUCTS USING SUPPORTING UNITS

This is a continuation of co-pending application Ser. No. 317,953 filed on Oct. 30, 1981, now abandoned.

BACKGROUND OF THE INVENTION

1. Field of the Invention

The present invention relates to a storage system for products using supporting units, consisting of a staging with a number of stories, on one side of the staging at least one supply conveyor and at least one entry elevating device, which is movable along the staging in a longitudinal direction, as well as a device for feeding supporting units into the staging and on the other side of the staging at least one exit elevating device which also is movable along the staging in longitudinal direction and at least one exit conveyor.

2. Description of the Prior Art

A similar storage system is known from the Netherlands patent document No. 154.394. With this known storage system the supporting units are pushed into the staging with the help of a pushing device and the supporting units already present in the staging are pushed on by the entering supporting unit. In order to take the supporting units out on the other side of the staging the guide-channels therefore should be completely filled with supporting units all joining each other. In addition the exit elevating device must be positioned on the other side of the guide-channel, which is filled up with supporting units at the end on the entry side.

SUMMARY OF THE INVENTION

The storage system according to the invention differs from the known storage system in such a way that in each story of the staging one or more conveyors are mounted, which on both sides of the staging are connectable with a driving device which is movable on the entry elevating device respectively on the exit elevating device in a vertical direction.

By application of these measures, it is attained that the conveyors in the several stories do not necessarily have to be completely filled in order to take out supporting units from the conveyors on the other side of the staging.

In a preferred embodiment of the storage system according to the invention, each story-conveyor is a step-conveyor which consists of a supporting channel, which has fitted to its bottom a row of fixed wedges with the sloping surfaces toward the top side, as well as of a lifting beam situated above the supporting channel which lifting beam is fitted with a row of movable wedges with sloping surfaces inclined with respect to the sloping surface of the fixed wedges and a transport beam which has a bottom surface which reclines toward the horizontal top side of the movable wedges.

With this extremely simple and yet robust construction of the conveyors, an apparatus is obtained which needs little or no maintenance and is easily connectable with or disconnectable from the driving devices.

With a particularly appropriate construction of the storage system according to the invention the step-conveyor consists of a supporting channel and of at least one supporting beam, having an underside fitted with hingeable hung carrying segments with a spiral shaped tread which ends, at both extremes, in a contact point. With this construction type of the step-conveyor the lifting beam as described in the above construction type of the step-conveyor can be omitted. The construction becomes more simple and cheaper also because as a result, only one driving device is required.

According to the invention, on the spiral-shaped tread, each carrying-segment has a V-shaped cross-section which fits into a V-shaped longitudinal groove of the supporting channel.

With the existing devices for the storage of products and the collecting of orders of such products, crates, boxes and/or cases are used for the transport and storage of the products. Those crates, etc. are piled on pallets or loading plates, in containers and/or on roll-carts and the like, which in turn are stored in appropriate storage frames. Apart from the expenses for the purchase of pallets and the like, such appliances have the disadvantage that in case orders have to be collected as a unit a crate, box or case, the pallets and the like have to be totally or partly unloaded for the collecting of the orders, whereas the empty pallets must be conveyed, cleaned and stored. Furthermore, the crates on the pallets are immediately available, because the taking-off of a crate from a pallet after the supply of that pallet, or going to that pallet, consumes much time, whereas automatic discharge from such a pallet requires relatively high investments and much space.

According to the invention the exit elevating device is fitted with a transfer device for the supporting units in the exit conveyor which is connected with an accumulating store by means of conveyors. The accumulating store consists of at least one collecting conveyor for each product to be delivered, whereas each collecting conveyor is fitted at its far end with a mechanism which can transfer the supporting units onto an order-collecting conveyor.

The system according to the invention does not have the disadvantage of the existing systems, because the crates, boxes and/or cases can be transported as individual and separate units, can be stored and collected without the need for appliances such as pallets, containers or roll-carts. At the same time the demand that the products can be discharged in the same sequence from the staging as they are supplied to the staging, has been fulfilled. The collecting of orders in small units is of special interest for the food industry and particularly for milk distribution stations where bottles or cardboard packs are transported in crates.

According to the invention the transfer device of the exit elevating device can further transfer the supporting units onto a second exit conveyor which can supply the supporting units via other conveyors to a manual order collecting station in which one or more supporting units can be filled manually with different products per supporting unit and which is fitted with an exit conveyor which can transfer such supporting units onto the order collecting conveyor.

Thus, in a simple way it is possible to deliver on order not only crates with one type of product, but also one or more crates with different types of product in each crate can be filled.

The present invention also relates to a storage system whereby the staging is divided in a number of compartments next to each other, in which each consists of one or more supporting units situated on top of each other, on which one or more rows of products are lying next to each other.

A preferential type of storage system according to the invention is constructed so that the compartments are separated from each other by chambers and a device is fitted for the circulation of conditioned air through the chambers and between the supporting units mainly in the horizontal direction through the rows of products.

With the circulation device cooled air can be directed transversely through the rows of products on the supporting units so that the temperature of the products can be kept to the desired low value, which has a favorable influence on the maximum storage time of these products with respect to their freshness.

With this storage sysem according to the invention preferably primary partitions are placed between the chambers and compartments which partitions are fitted with flow openings on the level of the rows of products.

By means of the flow openings a concentrated cooled airstream may be directed on to the products. Thus, the cooling effect of the airstream on the products is intensified.

Further with this storage system according to the invention the rows of products on the supporting units are separated from each other in an appropriate way by means of secondary partitions in which flow openings are fitted.

By applying this measure the result is that the airstream with each row of products can be concentrated again, so that the cooling effect of the airstream on the products over the total width of the compartment can be kept substantially constant.

According to the invention the flow openings in the secondary partitions between the rows of products are fitted at the same height as the flow openings in the primary partitions between the chambers and the compartments by which, according to the invention the flow openings in the primary partitions and the secondary partitions, seen in vertical direction, are lying under the horizontal middle level of the products on the supporting units.

By applying these measures an optimal cooling effect of the airstream on the products can be obtained.

BRIEF DESCRIPTION OF THE DRAWINGS

The invention will be explained in detail with reference to the drawings which include some examples of constructions.

FIGS. 5A and 5B show a transverse cross section and a longitudinal cross section respectively of a story-conveyor in a resting position, FIGS. 6A and 6B show a transverse cross section and a longitudinal cross section respectively of the story-conveyor in a transporting position, FIG. 7 is a schematic longitudinal cross section of the storage system according to the invention, fitted with an air circulation system.

FIG. 8 is a transverse cross section of the storage system taken along line VIII—VIII in FIG. 7, FIG. 9 is a partial longitudinal cross section of the storage system according to the invention on a larger scale, FIG. 10 is a transverse cross section of another construction type of the step-conveyor applied to the storage system according to the invention which in the left part of FIG. 10 is in resting position and in the right part of FIG. 10 is in the transport position, FIG. 11 is a partial cross section taken along line XI—XI in FIG. 10 and FIG. 12 is a partial cross section taken along line XII—XII in FIG. 10.

DESCRIPTION OF THE PREFERRED EMBODIMENT

In the description hereafter it is assumed that the products to be delivered are packed in crates which are filled with full bottles, cardboard packs and/or other packages, in the production department of, for example, a dairy. The crates which are filled with full bottles or other packages are supplied from the production units by means of one or more supply conveyors 1 to the storage staging 2. In this connection the number of supply conveyors 1 can be equal to the number of production units, which are not shown in FIG. 1.

Figure 1:
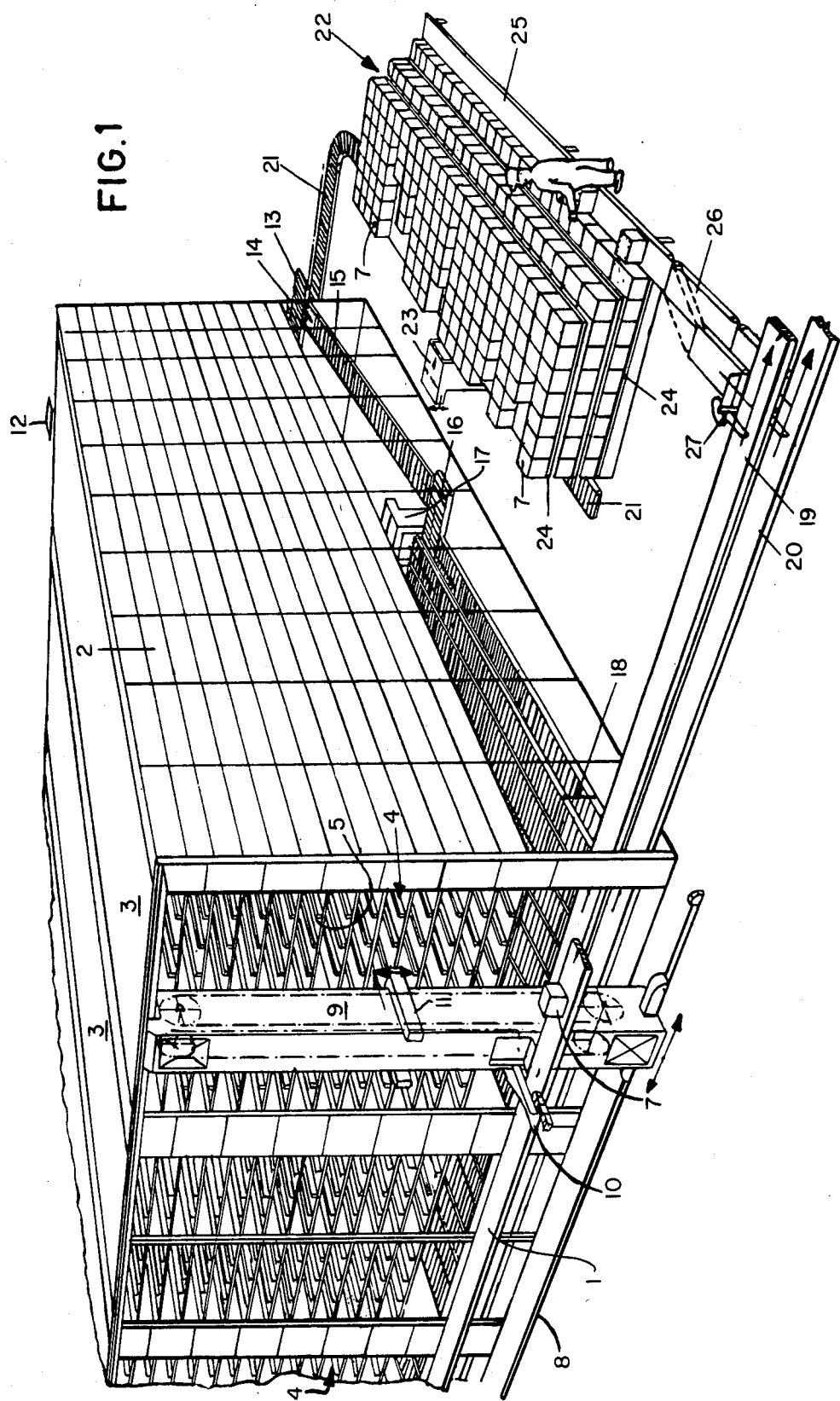
FIG. 1 is a perspective view of the storage system according to the invention.

By way of example, the storage staging 2 which is drawn in FIG. 1 consists of seven compartments 3 next to each other which in the vertical direction are divided into thirteen layers of supporting units 4. In each layer 4 there are eight story conveyors 5 lying next to each other, which in the usual way are supported by means of supporting beams 6 (see FIG. 4). In each story conveyor fifty filled crates 7 can be stored. The story conveyors are constructed as step-conveyors which hereafter will be described in detail with reference to FIGS. 4, 5 and 6. In this the crates are lifted from a carrier, transported over a certain distance, which is at least equal to the length of the biggest crate in use and next put down again on the carrier. The step-conveyors are placed into a supporting channel which is closed to the underside and which rests on the supporting beams 6. These beams are placed under a small slope against the horizontal level. This prevents leaking packages in a conveyor from contaminating the crates with packages situated on a lower conveyor. The angle of inclination of the supporting channels causes the water with which the channels are periodically cleaned to run off to one side, be caught and discharged. The supporting channels can further be cleaned with a brush-cart running through the supporting channel without the necessity of removing the conveyor itself from the supporting channel.

To the entry side of the staging one or more swing elevators 9 are movable on rails 8. Each elevator 9 in principle can be moved along the total length of the staging 2 and can be positioned in front of each vertical row of step-conveyors 5. Preferably the number of elevators 9 is equal to the number of supply conveyors 1. At the height of supply conveyor 1 fixed to the elevator 9 a device 10 is mounted with which the crates 7 from the supply conveyor 1 can be transferred into the elevator 9. On elevator 9 a drive and coupling device 11 is mounted which is height adjustable and with which the crates can be transferred from the elevator until just in front of each step-conveyor 5 and this step-conveyor can be driven. The device 10 will be explained hereafter in detail with reference to FIG. 2 and 3 and the mechanism 11 will be explained hereafter in detail with reference to FIG. 4. As soon as a step-conveyor 5 is filled up completely with crates 7, the swing elevator 9 is moved over rails 8 to a nearby conveyor 5 and/or the drive and coupling device 11 is moved downwards or upwards on elevator 9.

The exiting elevators 9 operate totally independently so that several elevators can be in operation simultaneously to transfer the crates 7 from the supply conveyors 1, with, in general, different products, into the storage staging 2. The capacity of each elevator is sufficient to keep up with the crates 7 supplied by one production unit.

On the exit side of the storage staging 2 one or more exit elevating devices in the form of swing elevators 12 are situated which are constructed in the same way as the swing elevators 9 to the entry side. These elevators 12 are also fitted with a drive or coupling device (not drawn) which is constructed in the same manner as the corresponding device 11 and able to drive the step-conveyor in the same way but in the opposite direction with respect to that of the device 11. With the help of drive and coupling devices (not shown) the crates 7 can be transferred from the conveyors 5 into the elevator 12 which is working in the reverse direction with respect to the elevator 9 and which takes the crates from the drive and coupling devices and puts them on a transferring device which is constructed in a similar way to the device 10 according to FIGS. 2 and 3 but operates in the reverse direction and which transfers the crates 7 from the elevator 12 onto a first exit conveyor 13 which is constructed in the same way as the supply conveyor 1.

From the exit conveyor 13 the crates 7 are transferred by means of a transfer pusher device 14 on a sloping conveyor 15 which puts the crates 7 onto a distribution conveyor 16 which in turn transports the crates onto a transferring device 17.

The crate transferring device 17 puts the crates 7 on the crates accumulating conveyor 18. Each accumulating conveyor is to be used for the temporary storage of a number of crates 7 which are filled with only one type of product. According to FIG. 1 two layers of accumulating conveyors next to each other are supplied, but as a matter of course, if so desired, more than two layers of accumulating conveyors above each other can be supplied. The number of accumulating conveyors 18 in each layer is equal to the number of product types which have to be delivered. Preferably the accumulating conveyors 18 are mounted underneath the storage staging 2 in order to reduce the required floor space for the storage system.

The accumulating conveyors 18 can be constructed as sloping mounted roller conveyors on which the crates 7 roll by gravity to the lowermost end and come to a standstill against a stop (not shown) or against a preceding crate.

At the end of each accumulating conveyor 18 a transferring mechanism (not drawn) is mounted which transfers the crates from conveyor 18 onto one of the order collecting conveyors 19 and 20 which consist of driven roller conveyors. On the order collecting conveyors 19 and 20 the crates needed for one order can be collected and transported further in the direction of the arrow for further dispatch. Because several layers of accumulating conveyors 18 are mounted above each other, each layer has its own order collecting conveyor and the crates for several orders can be collected simultaneously.

The above described operation of the installation is meant for units e.g. crates, which have a relatively high turn-over (so-called "fast runners"). The accumulating conveyors 18 with transfer devices and the order collecting conveyors 19 and 20 allow quick collecting of orders consisting of such fast runners. The accumulating stock of these crates can be big with respect to the number of required order collecting conveyors. Via these accumulating conveyors relatively many crates can be worked up.

The crates with a very slow turn-over (so-called "slow runners") are treated differently.

In some cases the variation of the articles, in the supporting units or crates, can be very great. We take as an example fifteen hundred different articles or packings of which, for example, two hundred are fast runners and thirteen hundred are slow runners. If these articles would be treated in the same way as the fast runners a total of fifteen hundred accumulating conveyors 18 next to each other would be required. The production storage however would be small with respect to the large quantity of accumulating conveyors.

The collecting frequency of the slow runners is very low. Therefor for these articles another method is possible.

The installation can be divided in one part to be used for the "fast runners" and one part to be used for the "slow runners".

In the part for the slow runners the accumulating conveyors 18 are now used to take partial orders consisting of slow runners. If, as an example, there are fifty accumulating conveyors, then the elevators 12 take, for fifty orders, the articles from the storage, article after article, out of 1300 storage conveyors.

The number of units of one article is transferred to and distributed over fifty accumulating conveyors, by which a computer determines the number of units which is supplied to the conveyors in question. In this way, on the accumulating conveyors, partial orders are collected.

As soon as all articles needed for the fifty orders are transferred, fifty partial orders are lying ready to serve as a completion to the fast runners. Therefore the partial orders must be lying ready on the accumulating conveyors 18 before making-up of the orders starts.

The elevators 12 can start with the making-up of the next fifty partial orders only when the preceding partial orders are all delivered. This would mean that the making-up of the rest-orders should wait until the elevators 12 have again made-up the next fifty partial orders. In order to avoid this discontinuity, either (a) the fifty accumulating conveyors 18 for the slow runners can be constructed in double number (that is one hundred) and used intermittently or (b) fifty accumulating conveyors in the middle are fitted with stops or locking devices (not shown). During the making-up of the orders the crates run into these stops. As soon as the partial orders are made-up these fifty orders are all released simultaneously to the second half of the accumulating conveyors after which the stops or locking devices are raised.

The released orders are then lying ready for completion and the elevators 12 immediately can start with the making-up of the next partial orders on the first half of the accumulating conveyors 18.

Because the elevators 12 have to be driven very frequently for the making-up of the partial orders and the transferring device has to be height-adjusted many times, the making-up of the partial orders takes longer than the transfer of the fast runners by means of accumulating conveyors with transferring devices. However, because only a few units per time unit have to be transferred, this system can be used for the slow runners.

The collecting by means of the exit elevator and the storage of a partial order on the roller conveyors reduces considerably the number of required roller conveyors.

The number of required accumulating conveyors for slow runners could be, for example, fifty, so that fifty partial orders are lying ready for completion. For the making-up of orders in the usual way fifteenhundred roller conveyors would be necessary of which most would release only one unit now and then.

With the combined method of working as set forth above, for the fast runners, approximately two hundred roller conveyors are needed and for the slow runners the assumed fifty, so that the saving on roller conveyors is considerable.

For some bulky partial orders, more than one accumulating conveyor can be used.

In the manner described above it is economically possible to make-up automatically and under computer control, orders consisting of fast runners and slow runners.

The manual completion of automatically collected orders, of units with a high turn-over with units with a lower turn-over would result in the fact that administration should be divided into an automatic and a non-automatic part.

This would imply many control and administration actions. The costs for administration would then rise out of proportion. The goal should be to make-up the total orders as much as possible automatically under computer control which is possible according to the system as described above. Where exactly the separation between the slow runners and the fast runners should be drawn, depends on many factors, which, partly, can be judged only in practice. Fortunately the mechanical construction of the installation is almost the same for both systems. According to (a) above they are identical.

The difference lies only in manner of controlling. Changing the separation line is therefore possible without many difficulties. The above described transferring device (not shown) of the exit elevators 12 can transfer the crates from the elevators onto a second exit conveyor 21 which transports the crates 7 to a unit collecting station 22. The crates 7 are transferred by means of a transferring device 23 to one of the conveyors 24 of the unit collecting station 22. These conveyors 24 are situated next to each other in a number of layers above each other, by which the number of conveyors 24 is at least equal to the number of product types. The conveyor 24 consists of sloping roller conveyors, on which the crates 7 are transported forwards by gravity until a stop is reached. The crates stored in station 22 are homogeneous crates; that is each crate contains one type of product.

At the front side of station 22 a conveyor 25 is mounted. At station 22 an operator can fill an empty crate with the required number of packing units of different products needed for the order. Thus one crate can be filled, for example, with a number of bottles of milk, a number of bottles of custard, a number of bottles of yogurt, etc. The operator fills the heterogeneous crate with different types of product. Conveyor 25 transfers the crate via a switch point 26 and a gate 27 onto one of the order collecting conveyors 19 and 20, where the crate will be added to the order.

At the unit collecting station 22, displays can be fitted on which the packing units needed for each order are stated. This facilitates the making-up of the crates with different products. The filling of heterogeneous crates with different products can possibly also be done automatically.

With reference to FIGS. 2 through 6 the different transfer-, drive-, coupling- and transport devices will now be explained in detail.

Figure 2:
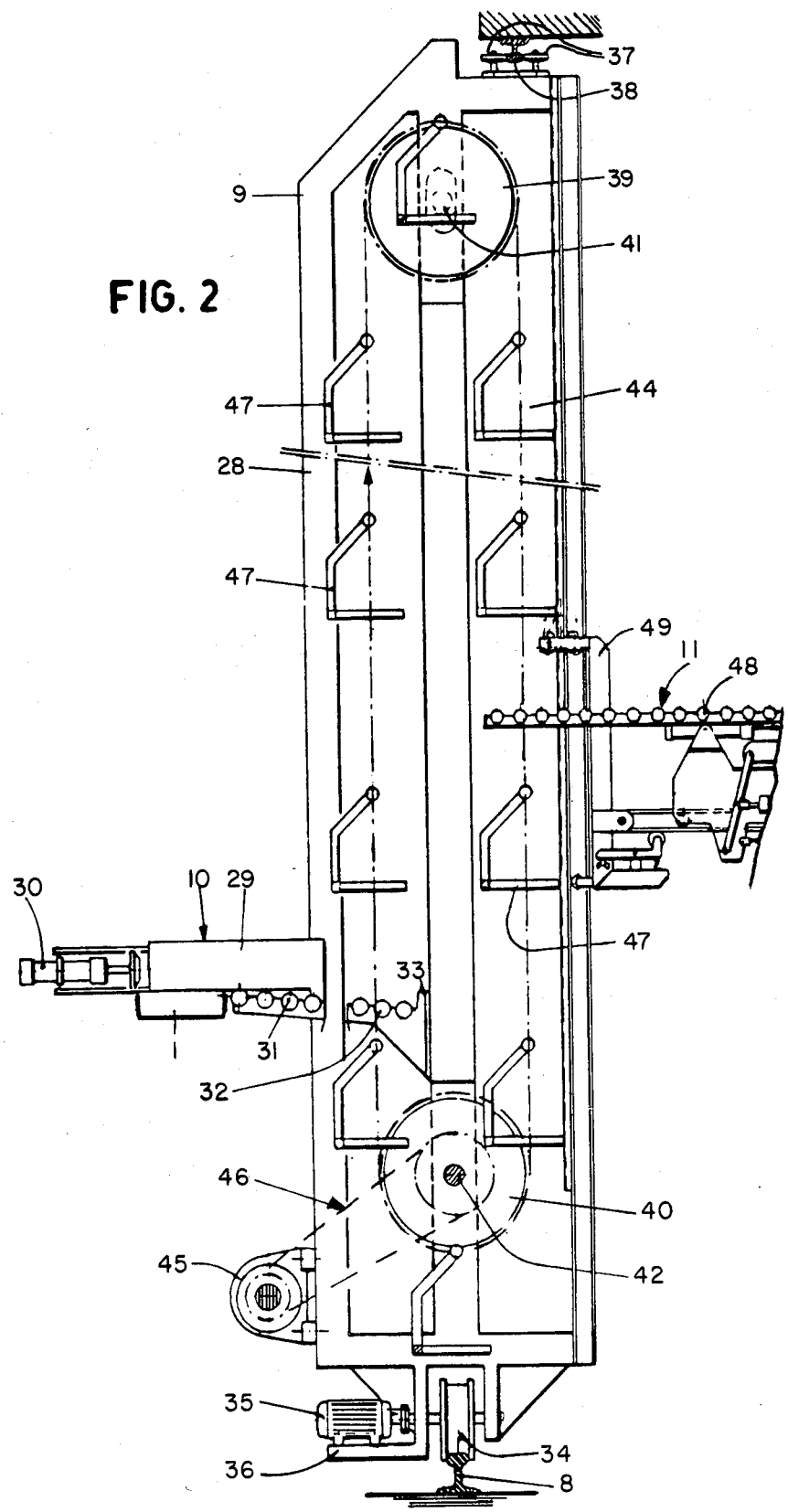
FIG. 2 is a side view in partial vertical cross section of the entry elevating device, constructed as a swing elevator.
Figure 3:
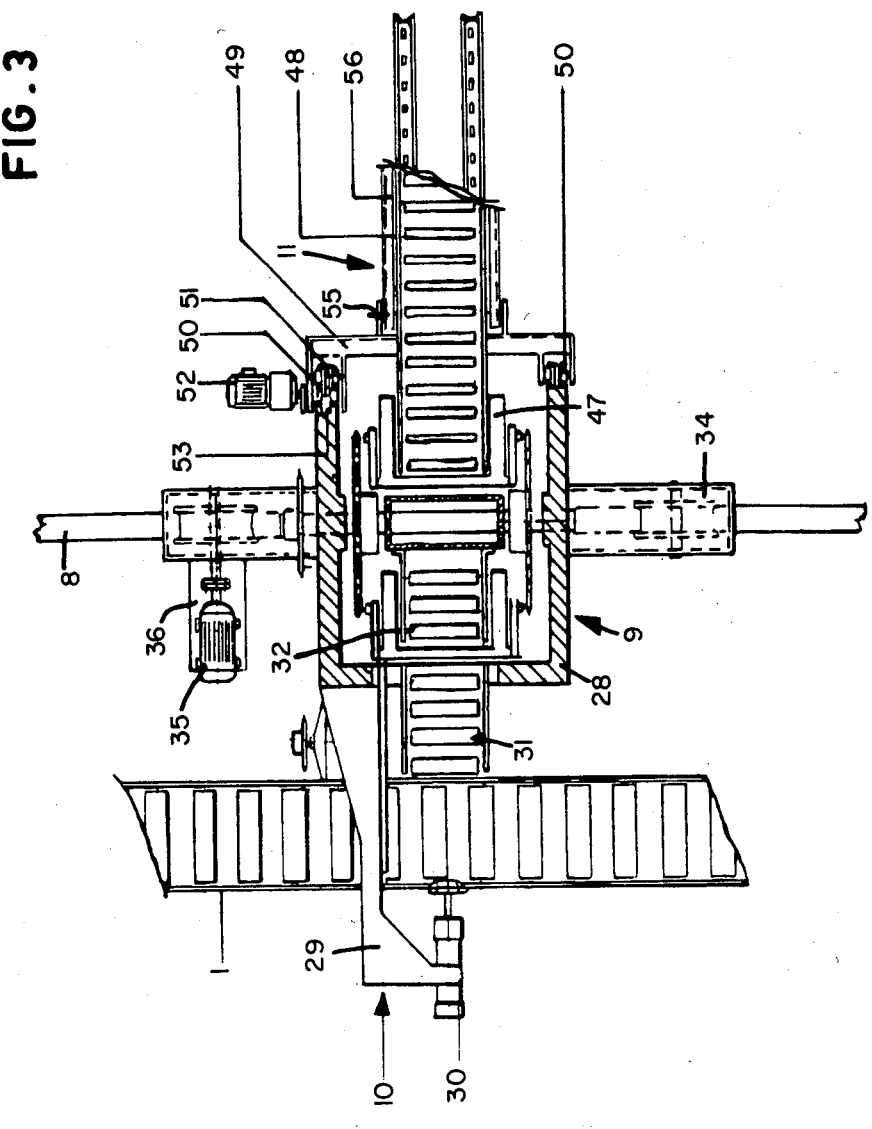
FIG. 3 is a top view in partial transverse cross section of the swing elevator according to FIG. 2 as well as of the transfer devices of the supporting units for the products moved from the supply conveyors into the entry elevating device and from the entry elevating device into the staging.

The transfer device 10, which is drawn in FIGS. 2 and 3, is fitted fixed to the frame 28 of the elevator 9 by means of a frame 29, on which a hydraulic or pneumatic cylinder 30 or another type of pushing device is mounted, as well as two sloping roller conveyors 31 and 32. The crate 7 comes to a standstill against frame 29 and is pushed by means of the cylinder 30 onto the roller conveyor 31 and from there transported by means of gravity onto the roller conveyor 32 against a stop 33.

The entry elevator is movable over the rail 8 by means of two or more wheels 34 which are driven by an electric motor 35 on a foundation plate 36 which is fixed to the frame 28. The entry elevator 9 is to its top side supported by means of two guiding wheels 37 on a rail 38. In the frame 28 of the elevator 9 is to the top- and bottom side a pair of chainwheels 39 respectively 40 rotatably supported on shafts 41 respectively 42 of which the top shaft 41 is height-adjustable. Over the chain wheels 39 and 40 run two endless chains 43 and 44 which can be tightened by moving the adjustable top shaft 41.

The chains 43 and 44 are driven in the direction of the arrow as drawn in FIG. 2 by means of an electric motor 45 and a chain- or belt drive 46. On the chains 43 and 44 supporting swings are hanged with which crates 7 are taken from the roller conveyor 32. The swings 47 put the crates 7 down on a conveyor 48 of the drive- and coupling device 11 which is drawn in FIG. 4.

The drive- and coupling device 11 is fitted with a lifting frame 49 which is fitted with guiding wheels 50. These wheels run over rails 51 which are fitted on the frame 28 of the entry elevator 9. To the top side of the lifting frame 49 an electric motor 52 is fitted, which, by means of a pinion 53 and a spur rack drive 54, can move the lifting frame 49 up and down alongside the elevator 9.

On the lifting frame 49 a supporting frame 56 is fitted which is hingeable around a shaft 55. The supporting frame 56 is spring-mount supported by means of a roll 57 on a lever 58, which lever is hingeable on a console 59 on the lifting frame 49 and supported underneath the roll by means of a spring 60 on console 59 whereas the lever is pushed to a stop 61 to the other end by means of the spring 60.

The actual drive- and coupling device 11 is fitted with a carrier 62 which is movable in the carrier frame 56 parallel to the step-conveyors 5 by means of the wheels 63. Provided for that purpose is a first hydraulic or pneumatic cylinder 64, which is hinged around a shaft 65 of the carrier frame 56 and of which the piston-rod 66 is fitted hinged to the carrier 62 with a fork 67. The above mentioned conveyor 48 is connected to the top side with the carrier frame 56.

The actual drive- and coupling device 11 for the step-conveyors 5 of the crates 7 will now be described with reference to FIG. 4.

To the side of the storage staging 2, the carrier 62 is fitted with a first gripper 68 with a search-opening 69 and a spring-mounted hingeable latch 70, which can be opened by means of a cylinder 71. Further a second cylinder 72 is hinged to the carrier 62, the piston-rod 73 of this cylinder 72 is hinged to a lever 74 which in its turn is hinged on one side on the carrier 62 and on the other side is hinged to a second gripper 75. To the side of the storage staging 2 the second gripper 75 is fitted with a search-opening 76 and a spring-mounted latch 77 which can be opened by means of a cylinder 78. The gripper 75 is spring supported on carrier 62 in the same way as the carrier frame 56 on the lifting frame 49. To the top side of the carrier 61 a third cylinder 79 is hinged, the piston-rod 80 of this cylinder 79 is hingeable connected to a third gripper 81 which, to the side of the staging 2, is fitted with a search-opening 82 and a spring-mounted hingeable latch 83 which can be opened by means of a cylinder 84. The third gripper 81 is movably supported with guiding cams 81' on the second gripper 75.

Although with the drawn construction type a choice has been made for a drive and control by means of hydraulic or pneumatic cylinders, other drives could also be applied for this purpose.

Now first a step-conveyor 5 will be described, before the coupling of the driving device 11 with the step-conveyor and the drive of the step-conveyor by the driving device 11 will be explained.

Figure 4:
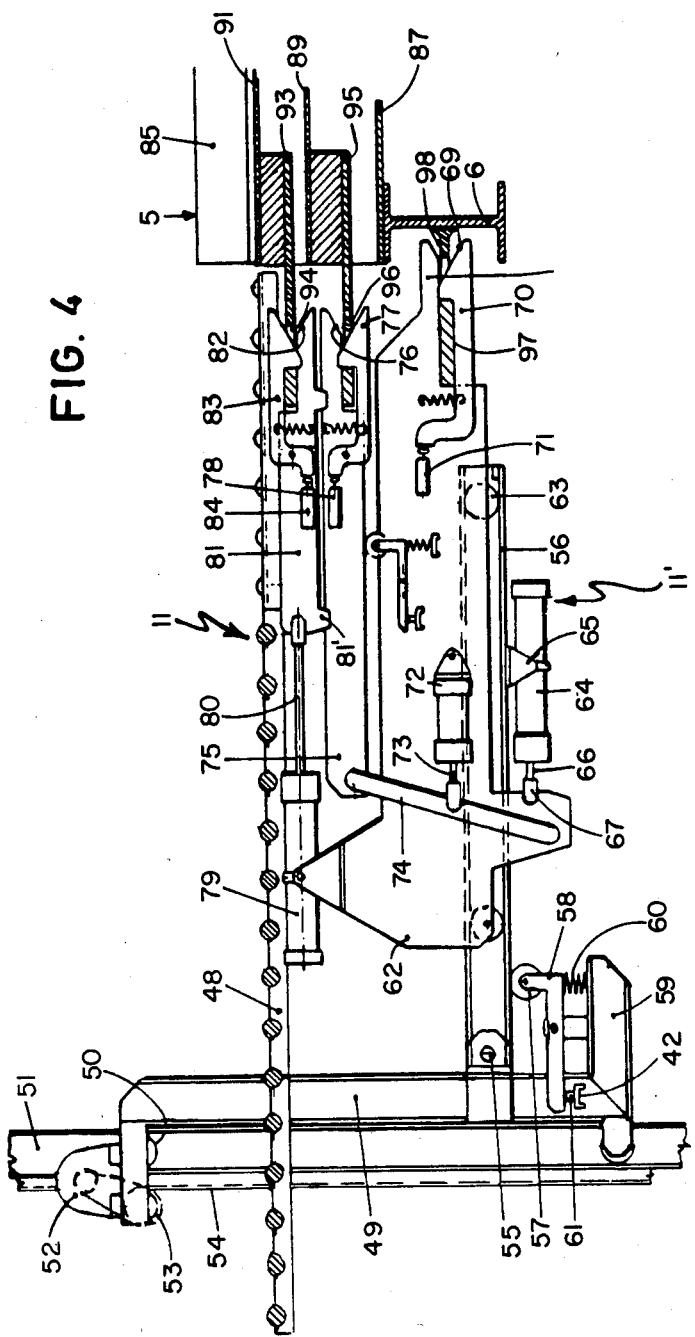
FIG. 4 is a side view, in partial cross section, of the driving device for the story-conveyors.

The step-conveyor 5 according to FIGS. 5 and 6 is mounted in a supporting channel 85 which rests on supporting beams 6 (FIG. 4). The supporting channel 85 consists of a rolled profile of steelsheet in which in both vertical walls a supporting level 86 for the crates 7 is formed. On the bottom 87 of the supporting channel 85 a number of fixed wedges 88 of e.g. nylon are fitted in the longitudinal direction a certain distance from each other. Above the bottom 87 a lifting beam 89 is fitted, to which in the longitudinal direction and at a certain distance from each other, movable wedges 90 are fitted, by which the sloping surface of the wedges 88 and 90 are lying on top of each other and can co-operate with each other. On the flat surface of the movable wedges 90 a transport beam 91 rests, with which the actual transport of the crates 7 takes place.

The lifting beam 89 and the transport beam 91 consist, just as the supporting channel, of a rolled profile of steelsheet so that these three parts in a direction perpendicular to their longitudinal direction can resist forces placed on the parts. In this way the step-conveyor can still be constructed inexpensively. The wedges 88 and 90 are made from a strong wear-proof synthetic material, such as nylon and therefore have a very long life.

With the step-conveyor 5 as drawn in FIGS. 5 and 6 the crates 7 are transported step by step in the direction of the arrow I as drawn on crate 7 in FIGS. 5B and 6B. This transport takes place as follows. According to FIGS. 5A and 5B the crate rests on the supporting levels 86 of the supporting channel 85. Thus, the lifting beam 89 and with this also the movable wedges 90 connected to the lifting beam 89 are in their starting position or resting position to the right, whereas the transport beam 91 is in its end position to the left. The upper surface 92 of the transport beam 91 is then lying underneath the supporting levels 86 of the supporting channel on which the crates 7 rest.

For the transport of the crates 7 firstly the transport beam 91 is moved to the right, thus in the direction of the entry elevator 9 according to the arrow II over a certain distance, which in general will be a little more than the biggest dimension of the crates, in the longitudinal direction of the transport beam 91, underneath the crates 7. Further the lifting beam 89 is moved to the left over a relatively small distance according to arrow III and put in the position according to FIG. 6B by this the movable wedges 90 are moved upwards over the fixed wedges 88 so that the transport beam 91 is lifted and the upper surface 92 comes above the supporting levels 86 of the supporting channel. Thus, the crates 7 are lifted from the supporting levels 86. Then the transport beam 91 is moved to the left over the above mentioned distance according to arrow IV in FIG. 6B with which the crates 7 are moved over the same distance. After the movement of the transport beam 91 to the left the lifting beam 89 is drawn back again in the direction of the arrow V in the utmost position to the right according to FIG. 5B, through this the lifting beam 89 and with this the transport beam 91 is lowered so far that the crates 7 are placed back again on the supporting levels 86 of the supporting channel 85 after which the starting position according to FIG. 5B is again reached. The fixed wedges 88 and the movable wedges 90 are fitted in longitudinal direction of the step-conveyor 5 and on equal distance of each other onto the bottom 87 of the supporting channel 85 respectively the lifting beam 89.

Further the construction type of the step-conveyor 5 according to FIGS. 5 and 6 has the additional advantage that the crates 7 are lifted by means of a relatively great supporting surface, moved and again put down so that also less strong packings than crates such as cardboard boxes and such-like can be transported without damaging.

Without difficulties during transport crates 7 can be stopped because in that case during the transport movement the transport beam 91 slides underneath the stopped crates.

Although in the application as crate-storage and transport device it is not required, the transport direction of the step-conveyors 5 can nevertheless be reversed without problems. The driving of the lifting beam 89 and the transport beam 91 of a step-conveyor takes place by means of the disconnectable drive- and coupling device 11 which is drawn in FIG. 4. With this construction type hydraulic or pneumatic cylinders are applied for the driving but those can also be replaced by a crank shaft drive or by a camshaft roller drive.

As mentioned before, it is necessary to clean the supporting channels 85 periodically. From the packages, however, sticky liquids can leak which are difficult to remove with water. A solution is to keep the supporting channels 85 clean by protecting them against contamination by means of exchangeable strips made of waterproof paper or synthetic material. The strips can be pre-treated (grooved) so that they easily fit into the U-shape of the supporting channels and stay in place well and through which they can be supplied on rolls with a preset length.

The dirty covering (not shown) can easily be exchanged by coupling the dirty covering with a clean one and subsequently pulling the covering through the supporting channels 85, in about the same way as most electric wires are renewed in a tube. The rolls having clean material can be put on reels which can be hung on holders to one end of the channels on the right height so that they can be led easily into the channels as soon as on the other end the dirty strips are pulled out.

The construction of the drive- and coupling device 11 for the step-conveyors 5 is explained in detail with reference to FIG. 4. Now the working of this device will be explained further.

According to FIG. 4 the drive- and coupling device is drawn in the position in which the device 11 is connected with a certain step-conveyor 5. By this the third gripper 81 is connected with a coupling-plate 93 by means of the spring-mounted latch 83. The coupling plate 93 is fitted with an opening 94 in which the latch 83 grips and which is fixed to the transport beam 91.

The second gripper 75 is connected with a coupling plate 95 by means of the spring-mounted latch 77. The coupling plate 95 is fitted with an opening 96 in which the latch 77 grips and which is fixed with the lifting beam 89.

The first gripper 68 is connected with a coupling plate 97 by means of the spring-mounted latch 70. The coupling plate 97 is fitted with an opening 98 in which the latch 70 grips and which is fixed to the supporting beam 6 of the step-conveyor 5.

In this construction type of the drive- and coupling device 11 the forces exerted by the grippers 75 and 81 on the transport beam 91 respectively the lifting beam 89 are transferred via the carrier 62 and the gripper 68 on the coupling-plate 97 and from there on the supporting beam 6 so that those are not transferred as bending forces to the swing elevator 9.

In FIG. 4 the drive- and coupling device 11 is drawn in the coupled position with the step-conveyor 5 and the supporting beam 6. The disconnecting starts with the opening of the latch 70 by means of the cylinder 71. Then the cylinder 64 pushes the carrier 62 over a small distance to the left, by which the coupled grippers 75 and 81 take the lifting beam 89 and respectively the transport beam 91 over the same distance to the left. Then also the latches 77 and 83 are opened by means of the cylinders 78 and respectively 84. The carrier 62 is pushed further to the left by means of cylinder 64 so that the grippers 75 and 81 will come out of reach of the coupling plates 95 and 93. The drive- and coupling device 11 is now completely disconnected and can be moved to another step-conveyor 5. In this case the device 11 can be moved upwards or downwards with the help of the electric motor 52 and the lifting frame 49 on the elevator 9 and/or by moving the elevator 9 to the left or to the right with the help of electric motor 35 and wheels 34 over rail 8.

In order to connect the drive- and coupling device again with the next step-conveyor 5, the carrier 62 is moved to the right by means of the cylinder 64, see FIG. 4. The search-opening 69 of the gripper 68 has a longer reach than the search-openings 76 and 82 of the grippers 75 and 81 so that firstly the search-opening 69 reaches its matching coupling plate 97. A deviation of the position in vertical direction of the device 11 with respect to that position of the step-conveyor 5 is corrected by allowing carrier 62 to pivot with respect to the search-opening 69. The supporting frame 56 with respect to the lifting frame 49 in co-operation with the coupling plate 97, through which the search-openings 76 and 82 are already brought to approximately the proper height before these search-openings have reached the coupling-plates 95 and 93. During the further movement of the carrier by means of the cylinder 64 the grippers 75 and 81 touch the coupling-plates 95 and 93 after which the latches 77 and 83 grip into the openings 96 and 94 respectively. The carrier 62 is moved still further to the right until the latch 70 grips into the opening 98 of the coupling-plate 97 after which the coupling of the driving-device 11 with the step-conveyor 5 is completed.

Now the transport of the crates 7 by means of the step-conveyor 5 can start (see the FIGS. 2 and 4.) The elevating-swings 47 put the crates 7 down on the driven conveyor 48, which moves the crates to the right until unto the step-conveyor. The right end-part of the driven conveyor 48 (see FIG. 3) is fork-shaped by which the long rolls are exchanged by short small rolls which are fitted on both sides on the supporting beams of the conveyor 48. Then the transport beam 91 is pulled out to the left by means of the cylinder 79 over a certain distance, which equals the transport distance, over one step of the step-conveyor 5 into the fork-hole of the conveyor 48 by which the transport beam 91 moves underneath the crate 7 in readiness. Then the lifting beam 89 is pushed by means of the cylinder 72 over a short distance to the right, through which by means of the wedges 88 and 90 the transport beam 91 and the crate 7 to be transported into the conveyor 5 are lifted. After that the transport beam 91 is moved to the right by means of cylinder 79 by which the crate 7 just taken is moved until above the beginning of the supporting channel 5. The lifting beam 89 is then brought back to the left in the original position by means of the cylinder 72, so that the crate 7 is put down on the supporting levels 86 of the supporting channel 85.

With the placement of the next crate on the conveyor 5 the first crate 7 is moved further over the transport distance over the supporting channel 5 whereas the next arriving crate 7 is put down on the original place of the first crate. In this way the step-conveyor 5 can be loaded with crates. As soon as the first crate reaches the far end of the conveyor 5 (the exit side), the drive of the conveyor 5 stops, the drive- and coupling device 11 is disconnected and moved to a nearby step-conveyor 5 which, after coupling with the driving device 11, can be loaded.

The storage system 1, which is drawn in FIG. 1, is placed into coolingroom 99, which is drawn in the FIGS. 7, 8 and 9 and which is provided with a device for circulation and cooling of air, which will be explained in detail with reference to FIGS. 7, 8 and 9.

The compartments 3 of the storage system according to FIG. 1 are separated from each other by chambers 100 and 101 (FIG. 7) which alternately are fitted between the compartments 3 and which are closed to the entry side and the exit side with vertical partitions 102 (FIG. 8). The chambers 100 are on the underside closed by a horizontal partition 103 whereas on the top side of the chambers 100 a horizontal partition is fitted, in which, equally divided over the width of the storage system, a number of ventilators 105 is mounted. The chambers 101 are open on the underside and on the top side closed by a horizontal partition 106, whereas the chambers 101, which adjoin the side walls of the shed 99 are closed to the top side by horizontal partitions 106'.

To the entry side and to the exit side of the storage system 1, air-coolers 107 fitted with ventilators of a known type are hung from the ceiling of the shed 99 in the space 99' above the compartments 3, by which the coolers 107 can be mounted in a direct line with the rows of ventilators 105.

According to FIG. 9, which shows a schematic transverse cross section of the compartments 3, each compartment 3 of the storage system 1 is fitted with a supporting frame 108, which to the sides, is fitted with primary vertical partitions 109 which have slots 110 situated low in respect of the row of crates on the step-conveyor 5.

Further, according to FIG. 9 between the step-conveyors 5 secondary vertical partitions 111 are mounted, which on the same level as the partitions 109 are fitted with slots 112. The slots 110 and 112 in the primary and secondary partitions 109 and 111 are situated, seen in vertical direction, below the middle of the products in the crates.

The device for the circulation and cooling of the air in the storage system according to the invention, works as follows:

The ventilators 105 move the air from the chambers 100 upwards into the space 99' above the compartments 3. The air in the space 99' is sucked in by means of the ventilators in the aircoolers 107 and in cooled condition move downwards into the space 99'' to the entry side and the exit side of the storage system 1. This air is then forced to stream into the space 99''' under the compartments 3, from which space 99''' the air streams upwards into the chambers 101 and from there through the slots 110 in the primary partitions 109 and through the slots 112 in the secondary partitions, transversely through the rows of crates in the step-conveyors 5. Because the slots 110 and 112, seen in the vertical direction are situated below the middle of the products in the crates each time the air streams are forced to turn off, so that the bottles or other containers in the first following row of crates over the greater part of their height are touched by the air stream and an effective cooling of the products takes place.

After the air has flowed transversely through the entire compartment the air arrives again in the chambers 100 so that the cycle is closed.

The step-conveyor 5, which is shown in FIGS. 10, 11 and 12, is fitted with a transport beam 113 and with a supporting channel 114, having a construction consisting of two symmetrical parts 114' and 114'', which are placed a distance from each other and thus leave open a longitudinal cleft 115. Via this cleft the bottom of the supporting channel 114 and the transport beam 113 can be cleaned. This could be done, for example, with a small carriage which runs over the underlying supporting channel and which can spray, with one or more nozzles, flush-water through the cleft 115. The supporting channel 114 can also consist of one piece by which the bottom underneath the transport beam is provided with rows of openings (not shown).

The supporting channel 114 and the supporting beam 113 consist of rolled profiles of steelplate and the supporting channel 114 is profiled so that the outside supporting levels 116 and 117 are formed for the product to be transported, for example, a crate 118 which is filled with milk bottles or other packages. The supporting channel can further be provided with discharge grooves 119 and 120 for leakage liquid, whereas in the innerside of each discharge groove 119 and 120 a V-shaped longitudinal groove 121 respectively 122 is formed which has a function for the transport of the crates 118 as will be explained hereafter. Between the discharge grooves 119 and 120 and the V-shaped longitudinal grooves 121 and 122 supporting levels 123 and 124 for the transport beam 113 are formed as will be explained hereafter. The two parts 114' and 114'' of the supporting channel 114 are fixed to the above mentioned supporting beams 6 with bolts 125 (see also FIG. 4).

The transport beam 113 consists of a profile 126 of steel sheet, which to both its longitudinal sides has fitted a profile 127 and 128. These profiles 127 and 128 serve for the stiffening of the transport beam 113 and there are, at an equal distance between them, also a number of transverse shafts 129 fitted in holes. These transverse shafts 129 protrude from bores in the vertical innerwalls 130 and 131 of the profiles 127 and 128 and which rest with their far ends in the profiles 127 and 128 in savings 132 of bearings 133 and 134. These bearings 133 and 134 are fitted in the horizontal lower walls 135 and 136 of the profiles 127 and 128. These bearings 133 and 134 lean during the backward movement and in the rest position of the transport beam 113 on the supporting levels 123 and 124 of the supporting channel.

According to the invention the transport beam is, on its underside, fitted with hinged and hung carrying segments 137 and 138, which are fitted above the V-shaped longitudinal grooves 121 and 122 on the shafts 129. The carrying segments 137 and 138 are preferably made from wear-proof synthetic material which does not have to be lubricated. Between the carrying segments 137 and 138 a distance socket 139 is fitted on the shafts 129.

The carrying segments 137 and 138 have, according to the invention a spiral shaped tread 140 and 141 respectively which ends on both far ends in a stop-level 142 and 143 respectively, the function of which will be explained hereafter.

According to the invention each carrying segment 137, 138 has further a V-shaped transverse cross section on the spot of the spiral-shaped tread 140, 141. This V-shaped transverse cross section fits into the V-shaped longitudinal groove 121 and 122 respectively in the supporting channel 114. According to the invention the width of the V-shaped transverse cross section of the spiral-shaped tread 140, 141 near the far end 144 which is lying at the maximum distance of the shaft 129, is smaller than that of the V-shaped longitudinal groove 121, 122 in the bottom of the supporting channel 114. Further the V-shaped transverse cross section of the spiral-shaped tread 140, 141 is fitted, in the bottom turned side of the V-shaped longitudinal groove, with a flat level 145 which has a function which will be explained hereafter.

Now the operation of the step-conveyor according to FIG. 10 will be explained with reference to FIGS. 11 and 12.

The transport stroke of the transport beam 113 is indicated in FIG. 12 with the arrow T and the backward stroke in FIG. 11 with the arrow R. At the beginning of the transport stroke T the carrying segments 137 and 138 and the transport beam 113 are in the position as drawn in FIG. 11. The upper surface of the transport beam 113 lies under the supporting levels 116 and 117 of the supporting units to be transported, for example, crates 118 (FIG. 10). When the transport beam 113 is moved in the direction of the arrow T, as described above with respect to the first construction type of the step-conveyor 5, the carrying segments 137 and 138 immediately come into friction-gripping engagement with the V-shaped longitudinal grooves 121 and 122 and the carrying segments 137 and 138 turn in counter-clockwise direction, by which firstly the transport beam 113 and then the crates 118 are lifted until the carrying segments are resting with the flat surface 145 onto the bottom of the V-shaped longitudinal grooves 121 and 122.

At this point the stop-level 142 rests against the underside of the transport beam 113, whereas the tread 140, 141 engages the thinner far end 144 into the longitudinal groove 121, 122, so that the transport beam can be freely moved in the transport direction T and the crates 118 are transported over the desired distance.

At the beginning of the backward stroke R the carrying segments 137 and 138 are in a position as shown in FIG. 12. When the transport beam 113 is moved in the manner described above, in the direction R, the carrying segments 137 and 138 turn in clockwise direction and the transport beam with the crates 118 is first lowered. The crates 118 are supported by the supporting levels 116, 117 and the transport beam lowers further until the carrying segments have reached the position according to FIG. 11, so that the carrying segments with the stop-level 143 can rest against the underside of the transport beam 113 and the transport beam 113 can be freely moved in the direction of the arrow R until the starting position is reached again.

With this second type of construction of the step-conveyor according to the invention (for the drive in the entry elevating device) as well as in the exit elevating device only one hydraulic cylinder or other drive unit is needed because only the transport beam has to be driven and there is no lifting beam. The driving device of the step-conveyor according to the FIGS. 10, 11 and 12 can further be similar to that according to FIG. 4 or, for example, a crank-shaft drive mechanism.

The storage system as described above is controlled by a computer, which controls the start and end of the working of the different conveyors, drive and transfer devices and controls the sequence of the working of these devices, in accordance with the sequence and the size of the orders for different products.

What is claimed is:

1. A storage system for product-containing crates or the like of substantially identical dimensions, comprising, in combination:
   (a) a staging having a plurality of storeys extending between entry and exit sides of said staging,
   (b) at least one crate supply conveyor at said entry side and at least one crate removal conveyor at said exit side,
   (c) at least one entry elevating device at said entry side for receiving crates from a supply conveyor, and at least one exit elevating device at said exit side for delivering crates to a removal conveyor, said elevating devices being longitudinally movable along said entry and exit sides respectively,
   (d) operating means on each entry and exit elevating device which means are vertically movable along said elevating devices into alignment with selected storeys, and are adapted respectively to receive crates from an entry elevating device and insert them into a selected storey, and to extract crates from a selected story and insert them into an exit elevating device, and
   (e) one or more step conveyors for the crates, mounted in each storey and extending from the entry to exit sides of the staging, and adapted for operative interconnection with an operating means on an elevating device when said operating means is aligned with a selected storey, each step conveyor comprising a channel member provided with shoulder means along the length thereof for supporting crates and a channel therebetween having reciprocating means in said channel with forward and return strokes, said reciprocating means being adapted to move upwardly to engage the bottom of a crate supported on said shoulder means on a forward stroke towards said exit side, and to move downwardly to disengage the bottom of said crate on the return stroke toward said entry side, thus leaving the crate in a forwardly moved position resting on said shoulder means, said reciprocating means being activated when an operating means on an elevating device is in interconnected position with a corresponding step conveyor,
   whereby crates are successively received at said entry side, inserted into the step conveyor of a selected storey, advanced step-wise along said shoulder means, and then successively extracted from the exit side as desired
   and wherein said reciprocating means comprises at least one oscillating beam in the channel of the step conveyor, each beam having segments on the underside thereof hinged on shafts mounted crosswise in the channel, said segments having spiral tread surfaces engaging the bottom of the channel and shaped so that on the forward stroke of the beam a portion of a segment moves around its hinge to urge the beam upwardly to engage the bottom of an overlying crate to move it forwardly, and on the return stroke of beam, another portion of said segment urges the beam downwardly to disengage from the bottom of the crate, and leave the crate in a forwardly advanced position on said shoulder means of the channel.

2. A storage system according to claim 1, in which each spiral tread section has a V-shaped cross section adapted to engage a corresponding V-shaped groove in the bottom of the channel, said groove being shaped to cause said upward and downward movements of beam on its forward and return strokes.

* * * * *

UNITED STATES PATENT AND TRADEMARK OFFICE
CERTIFICATE OF CORRECTION

PATENT NO. : 4,787,803

DATED : November 29, 1988

INVENTOR(S) : Gerrit J. Van Elten et al.

It is certified that error appears in the above-identified patent and that said Letters Patent is hereby corrected as shown below:

On the title page, Item [63] should read --

Continuation of Ser. No. 317,953 filed as PCT NL81/00004 on March 6, 1981, published as WO81/02563 on Sept. 17, 1981, now abandoned.   --.

Column 1, lines 5 and 6, should read -- This is a continuation of co-pending application Ser. No. 317,953 filed as PCT NL81/00004 on March 6, 1981, published as WO81/02563 on Sept. 17, 1981, now abandoned.

Signed and Sealed this

Eighth Day of August, 1989

Attest:

DONALD J. QUIGG

Attesting Officer

Commissioner of Patents and Trademarks